(12) United States Patent
Gideoni et al.

(10) Patent No.: US 7,548,912 B2
(45) Date of Patent: Jun. 16, 2009

(54) SIMPLIFIED SEARCH INTERFACE FOR QUERYING A RELATIONAL DATABASE

(75) Inventors: Michal Gideoni, Seattle, WA (US);
David James Lee, Redmond, WA (US);
Joseph Michael Sherman, Redmond, WA (US); Smita Oiha, Remond, WA (US); Stefan Larimore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 11/598,433

(22) Filed: Nov. 13, 2006

(65) Prior Publication Data

US 2008/0114745 A1 May 15, 2008

(51) Int. Cl.
*G06F 7/00* (2006.01)
*G06F 17/30* (2006.01)
(52) U.S. Cl. ............................................. 707/4; 707/3
(58) Field of Classification Search .................. 707/1–4, 707/100–102, 10
See application file for complete search history.

(56) References Cited

U.S. PATENT DOCUMENTS

| | | | |
|---|---|---|---|
| 6,223,145 | B1 | 4/2001 | Hearst |
| 6,799,184 | B2 | 9/2004 | Bhatt et al. |
| 6,950,815 | B2 | 9/2005 | Tijare et al. |
| 2003/0093583 | A1 | 5/2003 | Doran et al. |
| 2003/0145047 | A1 | 7/2003 | Upton |
| 2003/0236859 | A1 | 12/2003 | Vaschillo et al. |
| 2005/0015361 | A1 | 1/2005 | Payton et al. |
| 2005/0262048 | A1* | 11/2005 | Dettinger et al. ............... 707/3 |
| 2006/0116986 | A1* | 6/2006 | Radcliffe ....................... 707/3 |
| 2006/0117002 | A1* | 6/2006 | Swen ............................. 707/4 |
| 2006/0195425 | A1 | 8/2006 | Deem et al. |
| 2006/0195477 | A1 | 8/2006 | Deem et al. |
| 2006/0224576 | A1 | 10/2006 | Liu et al. |
| 2008/0016038 | A1* | 1/2008 | Moestl .......................... 707/3 |

OTHER PUBLICATIONS

"Coveo Enterprise Search", http://www.coveo.com/en/Products/CES.aspx.
"Oracle Secure Enterprise Search 10g", Date: Mar. 2006, http://www.oracle.com/technology/products/oses/pdf/OSES_10g_DS_March2006.pdf
"Search and index API overview", http://publib.boulder.ibm.com/infocenter/wsiihelp/v8r3/index.jsp?topic=/com.ibm.websphere.ii.foundation.appdev.esearch.doc/developing/iivsnsrchind_htm.
"Coveo Enterprise Search", http://www.coveo.com/en/Products/CES.aspx, Oct. 2006.
"Search and index API overview", http://publib.boulder.ibm.com/infocenter/wsiihelp/v8r3/index.jsp?topic=/com.ibm.websphere.ii.foundation.appdev.esearch.doc/developing/iivsnsrchind_htm, Oct. 2006.

* cited by examiner

*Primary Examiner*—Don Wong
*Assistant Examiner*—Merilyn P Nguyen (57) ABSTRACT

Methods and computer-readable media are provided for performing a search on a relational database. According to one method, a query class is provided that includes properties that specify how a query is to be performed and how results from the query are to be returned, and an execute method that is called to perform the actual query. A keyword query class derived from the query class is also provided that includes keyword query properties and an execute method for performing the keyword query. In order to perform a keyword query of an SQL database, an instance of the keyword query class is created, the properties set on the instance, and the execute method called. When the execute method is called, the specified properties are translated into an equivalent SQL statement and the search is performed on the identified relational database by a search service.

20 Claims, 6 Drawing Sheets

SIMPLIFIED SEARCH INTERFACE FOR QUERYING A RELATIONAL DATABASE

BACKGROUND

Relational databases are databases that are organized and accessed according to the relationships between data items without the need for any consideration of physical orientation and relationship. Relationships between data items are generally expressed as tables having rows and columns, which may be interconnected. Data is stored in the tables so that the data can be reorganized and accessed in different ways without having to reorganize the database tables.

The structured query language ("SQL") is the most popular computer language used to create, modify, and retrieve data from relational database management systems. Using SQL, a skilled user can retrieve data from a database, create databases and database objects, add data, modify existing data, and perform other, more complex functions. Although SQL is a standard, many database products support SQL with proprietary extensions to the language format.

SQL commands can be used to interactively work with a database or can be utilized programmatically to interface with a database. For example, in the latter scenario, a SQL application programming interface ("API") can provide an interfaces through which programs can execute SQL queries on a database. Such an API may be used, for instance, by a World Wide Web ("WWW" or "Web") page for querying a backend database and providing the results of the query on the Web page.

Previous SQL APIs have been very complicated and difficult to use. Moreover, these APIs have not provided functionality for easily allowing a keyword-based search to be performed on a database, such as those that are so common today in application programs and on Web pages. The complexity and limitations of previous SQL APIs can be extremely frustrating for a developer trying to create a Web page or application program that executes even a simple keyword-based search query against a backend relational database.

It is with respect to these considerations and others that the disclosure made herein is provided.

SUMMARY

Methods and computer-readable media are provided herein for simplified searching of a relational database. Through the embodiments described herein, an API is exposed through which keyword-based queries may be easily performed upon a relational database. Keyword-based queries may be easily performed by application programs and other components executing locally on the same computer as the search service that performs the actual query, or by software components executing on computers that are remotely located on a network. Moreover, complex SQL-based queries may also be performed utilizing aspects of the same API.

According to one aspect presented herein, a local query object model is provided for enabling simplified keyword-based searching of a relational database. Through the object model, a developer can construct and execute a rich keyword query without regard to the underlying SQL syntax. In particular, the local query object model provided herein includes an abstract query class defining query properties that specify the manner in which the query is performed and how the results are returned, and an execute method for causing the query to be performed. The query properties may correspond to portions of an SQL statement.

According to other aspects provided herein, the query properties include a property for specifying a query string to be used in the query, a property for specifying that duplicate results should be removed from the query results, and other properties for specifying how the query should be performed and how the query results should be returned. A property may also be specified for instructing the search service to query and return data from multiple databases or multiple locations within the same database. In this manner, a single query can be utilized to effectively perform multiple searches.

According to other aspects, a keyword query class that is derived from the abstract query class is also provided. The keyword query class includes an execute method which, when called, causes a keyword query to be performed on a relational database. The keyword query class also defines keyword query properties that specify how the keyword query is to be performed and how the results of the keyword query are to be returned. For instance, the keyword query properties may include a property for specifying one or more properties that should be returned from the query, a property for specifying how the query results should be sorted when returned, and others.

In order to perform a keyword search, an instance of the keyword query class is created. The various properties are then set on the created instance. Many properties may include default values to make performing the query even easier for a developer. Once the required properties have been set, the execute method may be called on the instance to perform the query as specified. In response thereto, the specified properties are translated into an equivalent SQL statement and the search is performed on the identified relational database by a search service. The results are then returned for use by the calling program. In this manner, the experience of creating a rich query through the object model provided herein is much easier than via SQL syntax because a substantial amount of the processing necessary to convert from a conceptual query to an SQL statement is performed by the object model. A full text SQL query class that is derived from the abstract query class and utilized in a similar manner to the keyword query class is also provided herein.

According to another aspect, the query object model provided herein may be utilized remotely through the provision and use of a Web service. The Web service exposes a remote function call that receives a request packet as input and, in response thereto, performs a keyword query in the manner specified by one or more data elements set forth in the request packet. The contents of the request packet may be specified utilizing extensible markup language ("XML") with elements corresponding to the query properties and keyword query properties defined by the query object model. After the query has been performed, the query results are returned to the remote caller in a response packet, which may also be specified using XML.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods, and computer-readable media for providing a simplified interface for keyword searching of a relational database. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a simplified interface for keyword searching of a relational database will be described. In particular, FIG. 1 is a network diagram illustrating aspects of an illustrative operative environment for the subject matter described herein that includes a client computer 102, a network 106, and a server computer 104.

Figure 1:
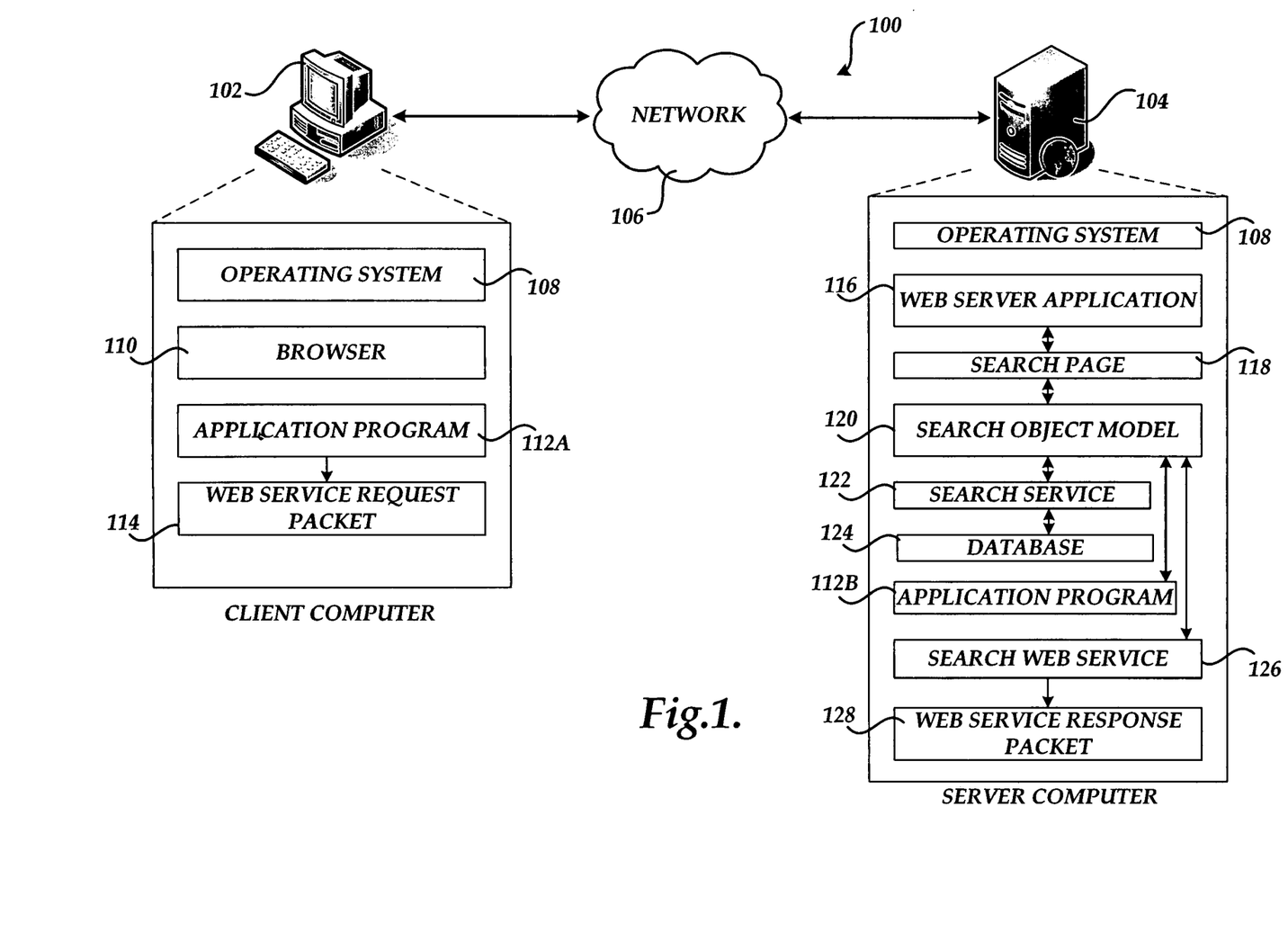
FIG. 1 is a network and software diagram showing an illustrative operating environment for the processes and computer systems described herein and several of the software components utilized by the computer systems described herein.

As shown in FIG. 1, the client computer 102 and the server computer 104 are communicatively coupled to one another through respective connections to the network 106. According to one implementation, the network 106 comprises the Internet. However, it should be appreciated that the network 106 may comprise a LAN, WAN, or other type of suitable network for connecting the client computer 102 and the server computer 104.

FIG. 1 also illustrates a number of software components utilized by the client computer 102 and the server computer 104. In particular, the client computer 102 includes an operating system 108 suitable for controlling the operation of a networked desktop or laptop computer. The server computer 104 includes an operating system 108 suitable for controlling the operation of a networked server computer. For instance, according to one implementation, the client computer 102 utilizes the WINDOWS XP or WINDOWS VISTA operating systems from MICROSOFT CORPORATION of Redmond, Wash. and the server computer 104 utilizes the WINDOWS SERVER 2003 operating system, also from MICROSOFT CORPORATION. The server computer 104 may Other operating systems, such as the LINUX operating system or the OSX operating system from APPLE COMPUTER, INC. may be utilized. It should be appreciated that although the embodiments presented herein are described in the context of a desktop or laptop client computer 102 and a remote server computer 104, many other types of computing devices and systems may be utilized to embody the various aspects presented herein.

According to one implementation, the client computer 102 also includes a Web browser program (referred to herein as a "browser") 110. The browser 110 is operative to request, receive, and display information pages, such as Web pages, from the server computer 104. In particular, the browser 110 is operative to establish a connection with a Web server application 116 executing on the server computer 104. Through the connection, the browser 110 may request an information page, such as the search page 118, that that includes functionality for searching a database 124. According to aspects presented herein, the database 124 is a relational database that may be queried using SQL. Through functionality provided by the search page 118, a user can type a keyword query that is then executed against the database 124 in the manner described below. It should be appreciated that the server computer 104 may maintain many different search pages 118 for performing different types of searches on different databases.

As will be described in greater detail herein, program code executing within the search page 118 utilizes aspects of a search object model 120 to perform a keyword search of the database 124. In particular, the search page 118 is operative to utilize objects exposed by the search object model 120 to cause a search service 122 to perform the actual query of the database 124. The search service 122, which may also be referred to herein as a query processor, performs the requested search and returns the search results to the requestor. As illustrated in FIG. 1, an application program 112B executing on the server computer 104 may also utilize aspects of the search object model 120 to perform keyword and SQL-based searches of the database 124. Additional details regarding the structure and use of the interfaces exposed by the search object model 120 are provided below with respect to FIGS. 2-5.

According to other aspects provided herein, an application program 112A or other software component executing on the client computer 102 can also utilize the features provided herein by the search object model 120. In order to utilize these features, the application program 112A creates a Web service request packet 114 that includes data that defines the search query how the search should be performed, and how the search results should be returned. The application program 112A then performs a remote function call to the search Web service 126 with the Web service request packet 114. In response thereto, the search Web service 126 causes a search to be performed of the database 124. The search Web service 126 stores the search results in a Web service response packet 128 and returns the packet 128 to the application program 112A in response to the query request. Additional details regarding the structure and use of the Web service request packet 114 and the Web service response packet 128 are provided below with respect to FIG. 5.

Figure 2:
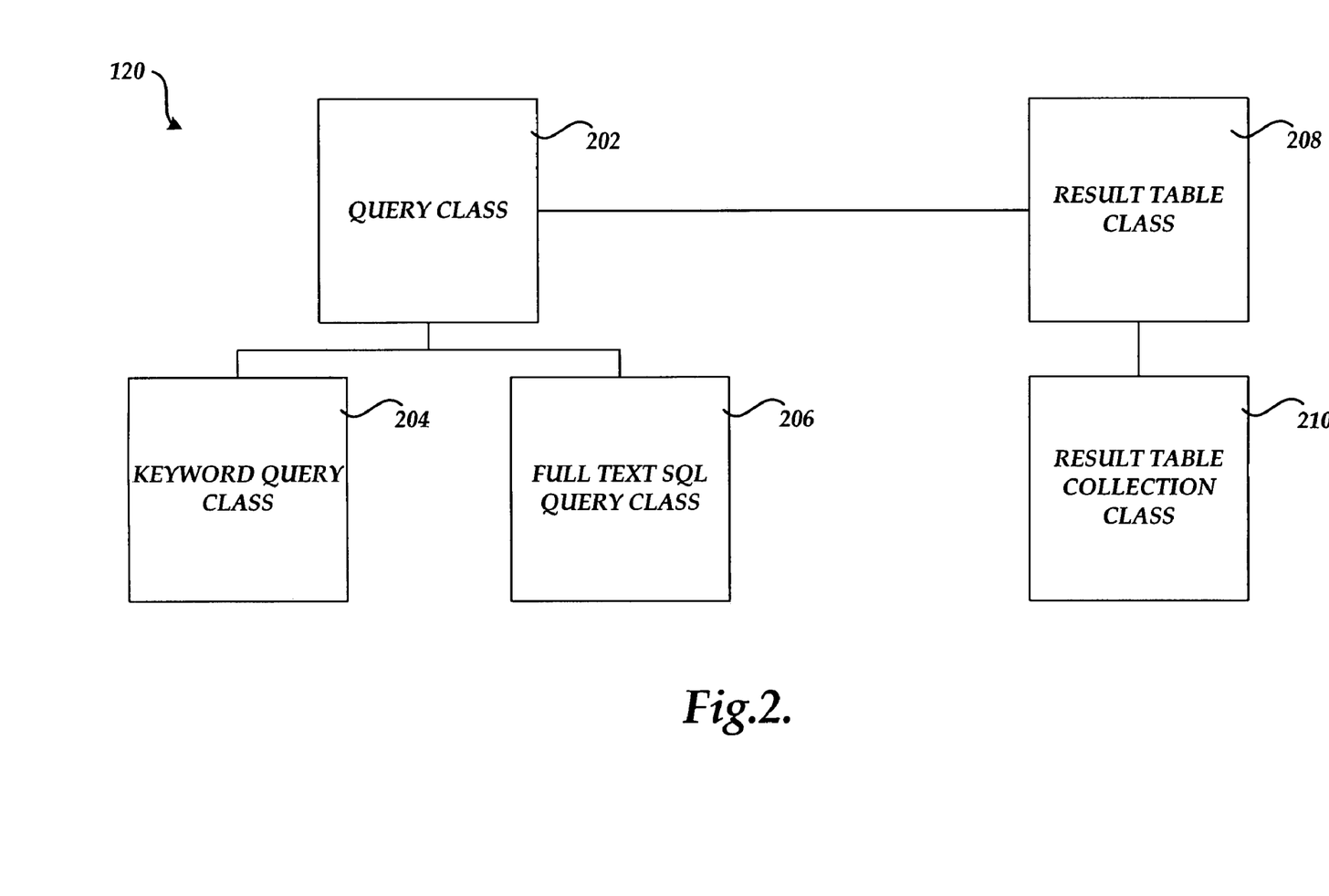
FIG. 2 is a class hierarchy diagram illustrating aspects of several object classes described herein for providing simplified keyword searching of a relational database according to various embodiments presented herein.

Turning now to FIG. 2, aspects of several object classes provided by the object model 120 will be described. In particular, as shown in FIG. 2, the object model 120 provides an abstract query class 202 from which a keyword query class 204 and a full text SQL query class 206 are sub-classed depending upon the desired keyword syntax. TABLE 1, below, illustrates the properties and methods exposed by the abstract query class 202 in one implementation presented herein as expressed using the C# programming language.

TABLE 1

```
public abstract class Query : IDisposable
{
    // Properties
    public string Application { get; }
    public QueryAuthenticationType AuthenticationType { get; set; }
    public CultureInfo Culture { get; set; }
    public bool EnableStemming { get; set; }
    public int HighlightedSentenceCount { get; set; }
    public QueryHint Hint { get; set; }
    public bool IgnoreAllNoiseQuery { get; set; }
    public KeywordInclusion KeywordInclusion { get; set; }
    public string QueryText { get; set; }
    public ResultType ResultTypes { get; set; }
    public int RowLimit { get; set; }
    public SPSite Site { get; }
    public Uri SiteContext { get; set; }
    public int StartRow { get; set; }
    public int Timeout { get; set; }
    public bool TrimDuplicates { get; set; }
    public SPUrlZone UrlZone { get; }
    // Methods
    public virtual void Dispose ( )
    public abstract ResultTableCollection Execute ( )
    public PropertyInformation[ ] GetProperties ( )
    public void GetResults (
        T:IMSSMultipleDataReader* pIMultiDataReader,
        ResultTableCollection result )
    public ScopeInformation[ ] GetScopes ( )
    protected SearchContext GetSearchApp ( )
}
```

As shown in TABLE 1, the abstract query class 202 defines a base set of query properties and methods for querying the database 124. In particular, the query properties specified by the abstract query class 202 are utilized to define the keywords for a query, how the query is to be performed, and how the results are to be returned. Although there is no need to express the properties using SQL syntax, the query properties may correspond to portions of an SQL statement.

The properties defined by the abstract query class 202 include a "Query Text" property that is used to specify the query string used for the query. When a keyword query is performed, this string is set to the text to be queried for. The abstract query class 202 also defines a "Row Limit" property for specifying the number of results to be returned by the query, a "Start Row" property for specifying the first result of the search results to be returned by the query, a "Timeout" property for specifying the amount of time after which the query should timeout, and a "Trim Duplicates" property for specifying whether duplicate search results should be returned by the query.

According to other aspects, the abstract query class 202 also defines a "Culture" property for indicating the locale used to interpret the query terms, an "Enable Stemming" property to indicate whether stemming should be utilized during the query, and a "Site" property for specifying the consumer of the request. The abstract query class 202 may also include a "Highlighted Sentence Count" property for defining the number of sentences that should be returned in a highlighted summary, an "Ignore All Noise Query" property for specifying that the query processor should ignore noise words, and a "Keyword Inclusion" property for specifying whether results must contain all of the terms in the search query or any of the terms in the search query.

According to other aspects, the abstract query class 202 also defines an "Application" property for getting the application name for the query request, an "Authentication Type" property for getting or setting the authentication type (either native or not native) for the request, and a "Hint" property for providing a hint to the query processor as to whether to use a full text index first or to use a property index first. The abstract query class 202 may also define a "Site Context" property for identifying the particular Web site within the server 104 is being searched and a "URL Zone" property that gets the originating URL zone for the query request. URL zones may be utilized to provide different levels of access to the same content. For example, one zone may provide an anonymous user experience and another an authenticated user experience in which check-in of documents may occur.

As discussed briefly above, each of the properties of the abstract query class 202 may be analogous to a portion of an SQL statement. For instance, the "Query Text" property is equivalent to specifying a WHERE clause in SQL syntax and the "Trim Duplicates" property is analogous to an SQL SELECT DISTINCT statement against a column representing a near-unique hash of the document content. It should be appreciated that the other query properties may also represent data that may be expressed using the SQL SET syntax.

According to one aspect provided herein, a single query may request multiple result sets. This functionality is provided through the use of the "Result Types" property. This property is an abstract class that defines the type of results requested from the search service 122. Multiple request type instances can be added to a request and, as a result, multiple result table class 208 instances are returned, one for each request type instance. More particularly, the "Request Types" property can be used to instruct the query processor to search in different locations within the same database or within different databases. In one implementation, this property is utilized to instruct the query processor to search a standard full text catalog, authored query results called special term results, and results matching a hand tagged schema called high confidence results. Any number of these locations, and potentially others, may be searched using a single query in the manner described herein. As will be discussed in greater detail below, when multiple result types are specified, the query will return a collection of result tables, one for each requested result type.

The abstract query class 202 also defines several methods. In particular, an "Execute" method is defined for executing the query request and returning all requested result types. The abstract query class 202 also defines a "Get Properties" method for returning the values of the properties described above. The "Get Results" method allows the caller to retrieve the results of the query. According to other implementations, the abstract query class 202 may also define a "Get Search App" method for getting the search context for the search service and a "Get Scopes" method for obtaining information about scopes that are registered with the search service. Scopes are constructs added by an administrator to restrict the set of documents searched.

TABLE 2, below, illustrates the properties and methods exposed by the keyword query class 204 as expressed using the C# programming language in one implementation. The keyword query class 204 is derived from the query class 202 described above, and defines a request using a simple keyword-based syntax. It is intended for applications that want to pass search query text directly to the search service 122 without processing.

TABLE 2

```
public sealed class KeywordQuery : Query
{
    // Properties
    public bool EnableUrlSmashing { get; set; }
    public StringCollection SelectProperties { get; }
    public SortCollection SortList { get; }
    // Methods
    public override sealed ResultTableCollection Execute ( )
}
```

According to one implementation, the keyword query class 204 exposes several keyword query properties. In particular, a "Select Properties" property is defined for specifying a list of the properties to be returned by the keyword query. The "Select Properties" collection is equivalent to specifying a SELECT clause in SQL syntax.

A "Sort List" property is also defined for specifying how the results from a search should be sorted. The "Sort List" property takes an array of sort structures, each sort structure consisting of a property name and sort direction. If the "Sort List" property is not set, the results are sorted by rank by default. The "Sort List" property is equivalent to specifying an ORDER BY clause in SQL syntax. A "Enable URL Smashing" property is also specified for controlling whether the URL smashing feature is used for the query. When this feature is enabled, then the keyword query is modified to search for a "smashed" version of the string against URLs. For example, if the query was "Sharepoint Search" and URL smashing was enabled, then a result of "http://SharePoint-Search" would match the query (e.g. the words in the query were smashed together to form a single word). As shown in TABLE 2, the keyword query class 204 also exposes an "Execute" method for performing a keyword-based query.

TABLE 3, below, illustrates the interface exposed by the full text SQL query class 206 in one implementation presented herein as expressed using the C# programming language. The full text SQL class 206 is also derived from the abstract query class 202 and defines a request using SQL syntax with full-text extensions. This class is intended for use by applications that need fine-grained control of the search command that is passed to the search service 122. In this regard, the full-text SQL query class 206 exposes an "Execute" method for performing a full text SQL query.

TABLE 3

```
public _sealed class FullTextSqlQuery: public Query
{
    // Methods
    public override sealed ResultTableCollection Execute ( )
}
```

TABLE 4, below, illustrates the interface exposed by the result table class 208 in one implementation presented herein as expressed using the C# programming language. The result table class 208 represents a single set of results from a query request. Each result table instance returned from a query corresponds to a request type specified in the "Request Types" property. An instance of the result table class 208 implements the "IDataReader" and "IDataRecord" classes to allow access to result rows.

TABLE 4

```
public _sealed class ResultTable : public IDataReader
{
  Public:
    //properties
      _property ResultType get__ResultType( )
      _property int get__RowCount( )
      _property int get__TotalRows( )
      _property bool get__IsTotalRowsExact( )
      _property int get__Depth( )
      _property bool get__IsClosed( )
      _property int get__RecordsAffected( )
      _property int get__FieldCount( )
      _property Object* get__Item( System::String* name)
      _property Object* get__Item(int i)
    //methods
      void Close( )
      void Dispose( )
      bool NextResult( )
      bool Read( )
      System::Data::DataTable * GetSchemaTable( )
    String* GetName(int i)
    String* GetDataTypeName(int i)
    Type* GetFieldType(int i)
    Object* GetValue(int i)
    int GetValues(Object* values _gc[ ])
    int GetOrdinal(String* name)
    bool GetBoolean(int i)
    unsigned char GetByte(int i)
    _int64 GetBytes(int i, _int64 fieldOffset, unsigned char buffer _gc[ ], int bufferoffset, int length)
      _wchar_t GetChar(int i)
      _int64 GetChars(int i, _int64 fieldoffset, _wchar_t buffer _gc[ ], int bufferoffset, int length)
      Guid GetGuid(int i)
      short GetInt16(int i)
      int GetInt32(int i)
      _int64 GetInt64(int i)
      float GetFloat(int i)
      double GetDouble(int i)
      String* GetString(int i)
      Decimal GetDecimal(int i)
      DateTime GetDateTime(int i)
      IDataReader* GetData(int i)
      bool IsDBNull(int i)
}
```

TABLE 5, below, illustrates the interface exposed by the result table collection class 210 in one implementation presented herein as expressed using the C# programming language. An instance of the result table collection class 210 provides a standard collection of result table class 208 instances, one for each request type specified in the query request. This allows an application to obtain multiple results with a single query request.

TABLE 5

```
{
    //Methods
    public IEnumerator GetEnumerator( )
    public bool Exists( __ResultType requestedType )
    //properties
    public __ResultTable this[__ResultType requestedType]
    public int Count
    public String[ ] IgnoredNoiseWords
    public String[ ] QueryTerms
    public KeywordInformation KeywordInformation
    public String SpellingSuggestion
    public ResultDefinition[ ] Definition
    public int ElapsedTime
    public int DatabaseTime
}
```

Based on the foregoing description of the classes provided by the search object model 120, it should be appreciated that a keyword query can be executed on the database 124 by instantiating a keyword query object, setting only a few properties on the object, and calling the "Execute" method on the object. Additional details regarding the structure and use of the classes described above are provided below with respect to FIGS. 3-4.

Figure 3:
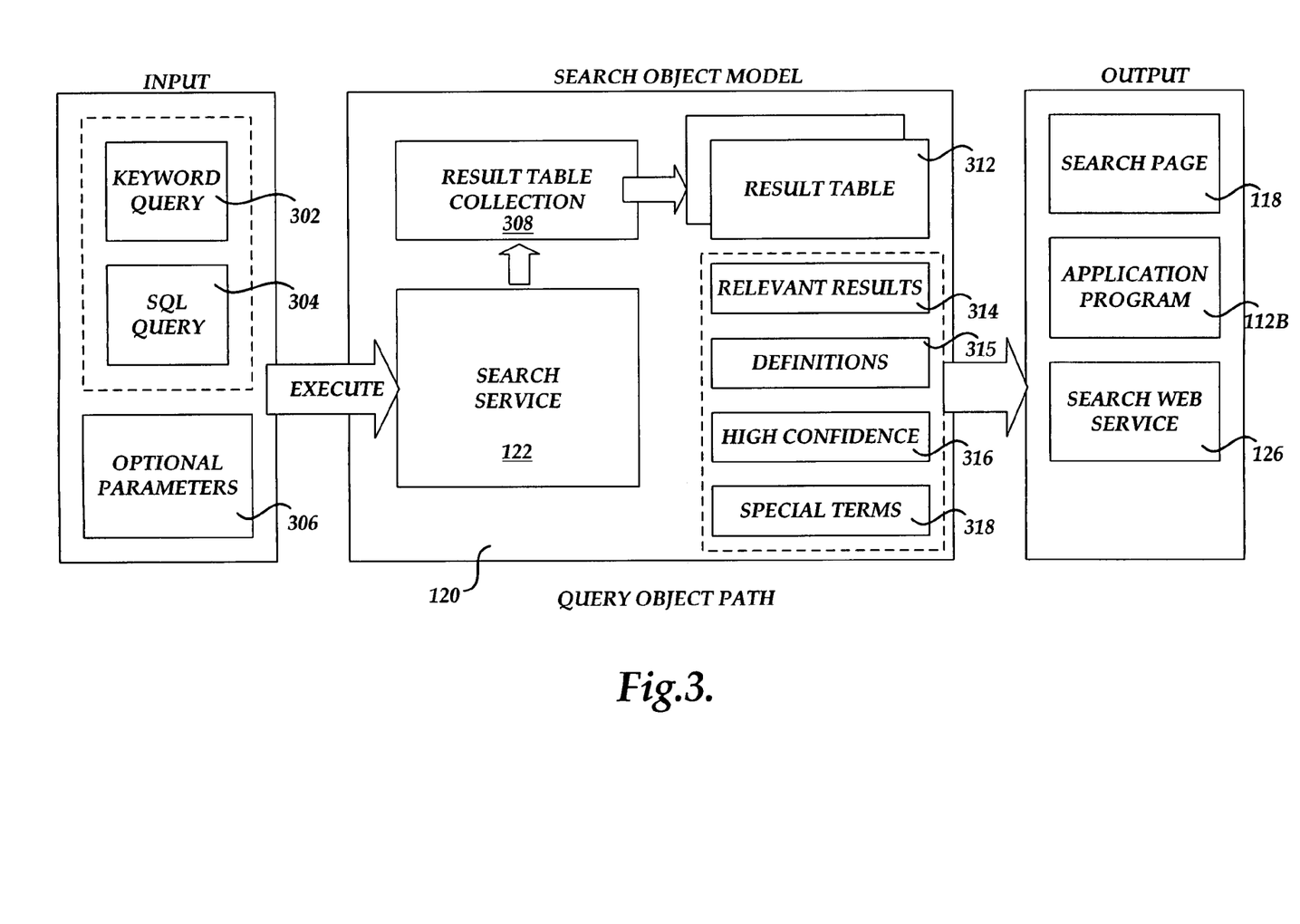
FIG. 3 is an object path diagram illustrating the use of a query class provided in one implementation described herein.

FIG. 3 is an object path diagram illustrating the use of the object model 120 provided in one implementation described herein. In particular, as shown in FIG. 3, the properties set in an instance 302 of the keyword query class 204 or an instance 304 of the full-text SQL query class 206 are provided to the search service 122 when the respective "Execute" method is called. The optional parameters 306 may also be provided to the search service 122.

In response to a call to the "Execute" method, the search service 122 performs the specified query and returns the results in an instance 308 of the result table collection class 210. As discussed above, the instance 308 may include multiple instances of the result table class 208, depending upon how the "Result Types" property was set. Depending upon the how the "Result Types" property was set, the result table instance 312 may include relevant results 314, definitions 315, high confidence results 316, and special terms results 318. The result table instance 312 is returned to the caller, which may be the search page 118, the application program 112B, or the search Web service 126, described below.

Figure 4:
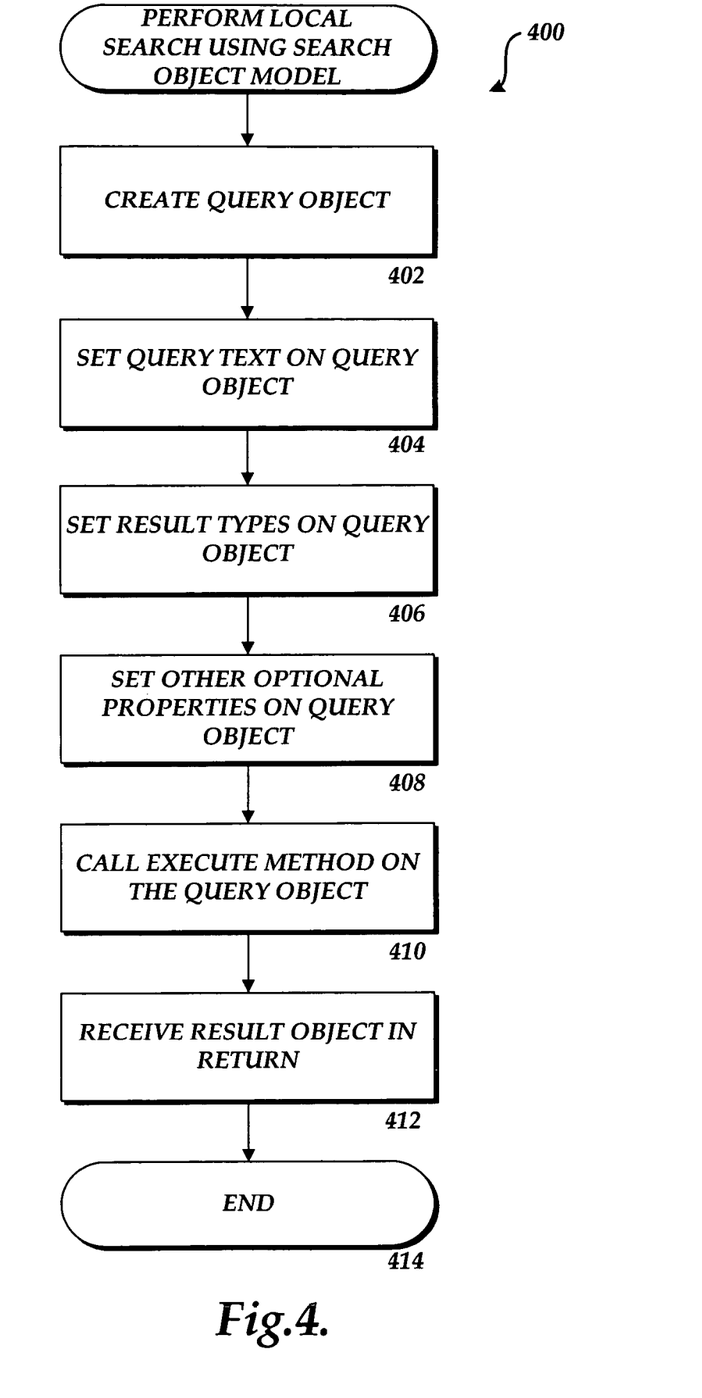
FIG. 4 is a flow diagram showing an illustrative routine for performing a local search of a relational database utilizing a search object model provided herein in one implementation.

Referring now to FIG. 4, additional details will be provided regarding the embodiments presented herein for performing a local keyword search on a relational database using a simplified search API. In particular, FIG. 4 is a flow diagram illustrating the operation of the server computer 104 according to one implementation for directly utilizing the search object model 120 described above to perform a search of the relational database 124.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at operation 402, where an object instance of either the keyword query class 204 or the full-text SQL query class 206 is created. The type of query object created depends upon whether a keyword query or a SQL query is desired. Once the appropriate query object has been created, the routine 400 continues to operation 404.

At operation 404, the "Query Text" property is set on the instantiated query object. As discussed above, the "Query Text" property is utilized to specify the query string used for the query. Once the "Query Text" property has been set, the routine 400 continues to operation 406, where the "Result Types" property is set to specify the desired result types in the manner described above. At operation 408, other optional properties may also be set on the query object. As mentioned above, commonly used default values may be specified for many of the properties to eliminate the requirement that all of the properties described herein must be set on the query object prior to calling the "Execute" method.

Once the appropriate properties have been set on the query object, the routine 400 continues to operation 410, where the "Execute" method is called on the query object to cause the search to be performed. Once the search service 122 has performed the query, a result table collection object is returned at operation 412. The calling application may then parse the results. TABLE 6, below, shows sample program code for creating a keyword query object, setting the required properties on the object, and calling the "Execute" method in one implementation as expressed using the C# programming language. The routine 400 ends at operation 414.

TABLE 6

```
Microsoft.SharePoint.SPSite site = new
Microsoft.SharePoint.SPSite("http://rrileyoss");
KeywordQuery request;
    request = new KeywordQuery(site);
    request.QueryText = strQuery;
    request.ResultTypes |= ResultType.RelevantResults;
    //if we want to get more than one result table
    //request.ResultTypes |=
ResultType.SpecialTermResults;
    //Setting optional parameters on the Query object
    request.RowLimit = 10;
    request.StartRow = 0;
    request.KeywordInclusion =
KeywordInclusion.AllKeywords;
    //Executing the query
    ResultTableCollection results = request.Execute( );
```

Figure 5:
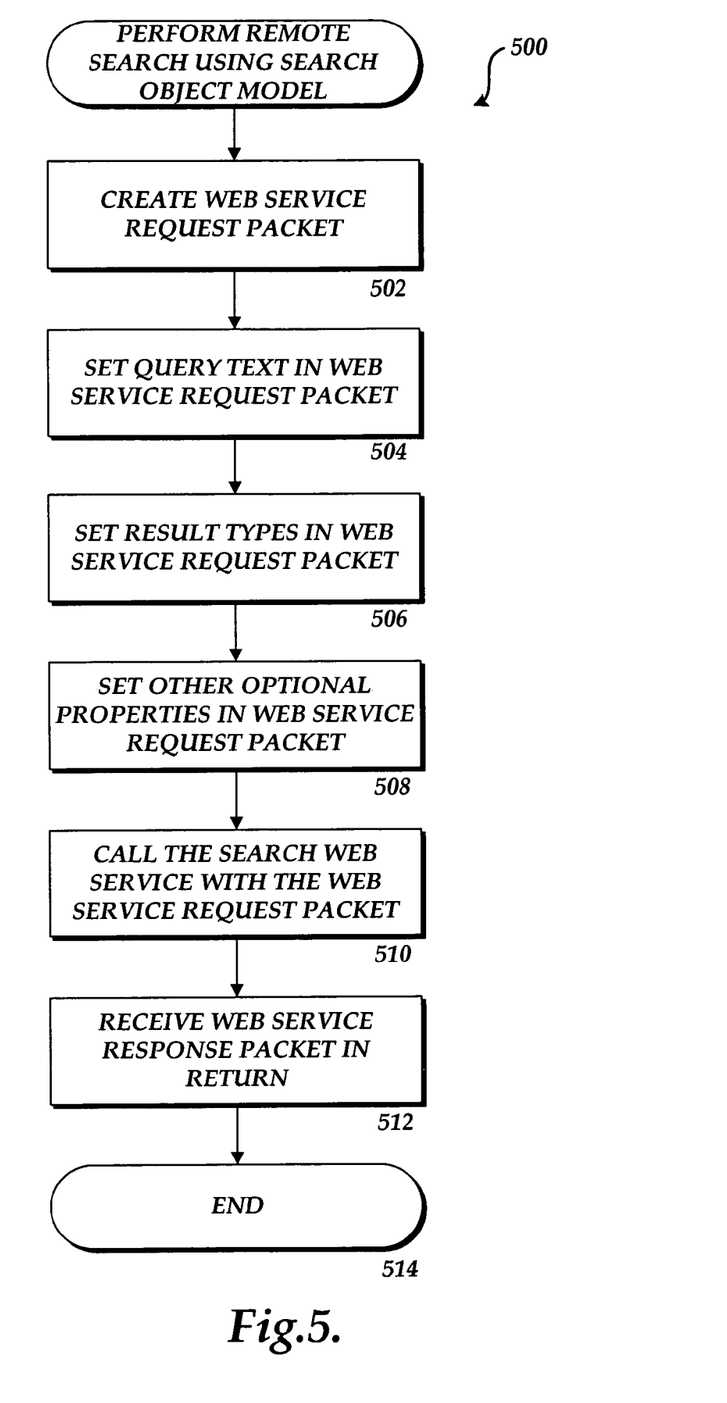
FIG. 5 is a flow diagram showing an illustrative routine for performing a remote keyword search of a relational database utilizing a search object model provided herein in one implementation.

FIG. 5 shows an illustrative routine 500 for performing a remote search, such as from an application program 112A executing on the client computer 102, using the aspects of the search object model 120 provided herein. As discussed briefly above, in order to utilize these features, the application program 112A creates a Web service request packet 114 that includes data that defines the search query, how the search should be performed, and how the search results should be returned. This occurs at operation 502.

In one implementation, the contents of the Web service request packet 114 are expressed using XML. However, any type of markup language or data format may be utilized to express the contents of the Web service request packet 114. In general, the Web service request packet 114 may include data elements that correspond to any or all of the properties and methods defined by the search object model 120 and described above. For instance, according to one implementation, an XML "<Properties>" element is defined for use in the Web service request packet 114 that corresponds to the "Select Properties" property described above with respect to the object model 120. Table 7, below, shows one illustrative schema for the "<Properties>" element.

TABLE 7

```
<Properties>
    <Property name="URL"></Property>
    <Property name="Title"></Property>
    <Property name="Path"></Property>
    <Property name="Size"></Property>
</Properties>
```

According to another implementation, an XML "<SortByProperties>" element is defined that corresponds to the "Sort List" property described above. The XML "<SortByProperties>" is utilized to specify the sort order for returned results. Table 8, below, shows one illustrative schema for the "<SortByProperties>" element.

TABLE 8

```
<SortByProperties>
    <SortByProperty name="rank"
        Direction="Descending">
    </SortByProperty>
</SortByProperties>
```

It should be appreciated that, by providing elements within the Web service request packet 114 corresponding to the properties and functions of the search object model 120, specifying a keyword query using the search Web service 126 is easier than a traditional SQL syntax. Table 9, below, shows the contents of a complete Web service request packet 114 in one implementation provided herein.

TABLE 9

```
<QueryPacket xmlns="urn:Microsoft.Search.Query">
    <Query>
        <SupportedFormats>
            <Format>urn:Microsoft.Search.Response.Document:Document
            </Format>
        </SupportedFormats>
        <Context>
            <QueryText type="STRING" language="en-us">SharePoint
            </QueryText>
        </Context>
        <Properties>
            <Property name="title" />
            <Property name="path" />
            <Property name="rank" />
            <Property name="write" />
            <Property name="size" />
        </Properties>
        <SortByProperties>
            <SortByProperty name="rank" direction="Descending"
                Order="1" />
        </SortByProperties>
        <ImplicitAndBehavior>true</ImplicitAndBehavior>
        <IncludeHighConfidenceResutts>true
        </IncludeHighConfidenceResults>
        <TrimDuplicates>true</TrimDuplicates>
        <IncludeSpecialTermResults>true</IncludeSpecialTermResults>
        <IgnoreAllNoiseQuery>true</IgnoreAllNoiseQuery>
        <EnableStemming>true</EnableStemming>
    </Query>
</QueryPacket>
```

From operation 502, the routine 500 continues to operation 504, where an element within the Web service request packet 114 corresponding to the "Query Text" property described above is populated. The routine 500 then continues to operation 506, where the element within the Web service request packet 114 corresponding to the "Result Types" property described above is populated. At operation 508, elements within the Web service request packet 114 corresponding to other optional properties described above are also populated.

Once the Web service request packet 114 has been created and the appropriate elements populated, the routine 500 continues to operation 510, where an execute method is called on the search Web service 126. In one implementation, a simple object access protocol ("SOAP") call is utilized to perform the remote function call, which includes the Web service request packet 114. In response thereto, the search Web service 126 causes the requested search to be performed and generates a Web service response packet 128 containing the query results. The Web service response packet 128 is received by the application program 112A at operation 512. The results may then be parsed and utilized by the application program 112. From operation 512, the routine 500 continues to operation 514, where it ends.

According to one implementation, the Web service response packet 128 also takes the form of an XML document. In order to return multiple result sets, XML elements are defined within the Web service response packet 128 to identify the inclusion of the multiple result sets. For instance, an XML "<RelevantResults>" element and an XML "<SpecialTermResults>" element may be defined for storing the relevant result sets. In one implementation, these elements are utilized in the manner shown below with respect to TABLE 10. The ability to make a single call to the search Web service 126 and receive multiple result sets in this manner optimizes both efficiency and ease of use.

TABLE 10

```
<Results>
    <RelevantResults>
        <title>SharePoint</title>
        <path>http://sharepoint</path>
        <rank>1000</rank>
        <write>2006-09-25T12:45:52-07:00</write>
        <size>0</size>
    </RelevantResults>
    <RelevantResults>
        <title>SharePoint Marketing</title>
        <path>http://infoweb/C5/spmarketing</path>
        <rank>933</rank>
        <write>2006-09-01T06:12:56-07:00</write>
        <size>0</size>
    </RelevantResults>
    ...
    <SpecialTermResults>
        <Title>InfoWeb: SharePoint Marketing Portal</Title>
        <Url>http://infoweb/C5/spmarketing/</Url>
        <Description>Product marketing information for SharePoint Portal Server, Content Management Server and Windows SharePoint Services.</Description>
    </SpecialTermResults>
    <SpecialTermResults>
        <Title>InfoWeb: Office SharePoint Portal Server</Title>
        <Url>http://infoweb/C10/C5/sharepoint/</Url>
        <Description>Internal site containing information and documentation for SharePoint Portal Server.</Description>
    </SpecialTermResults>
</Results>
```

Figure 6:
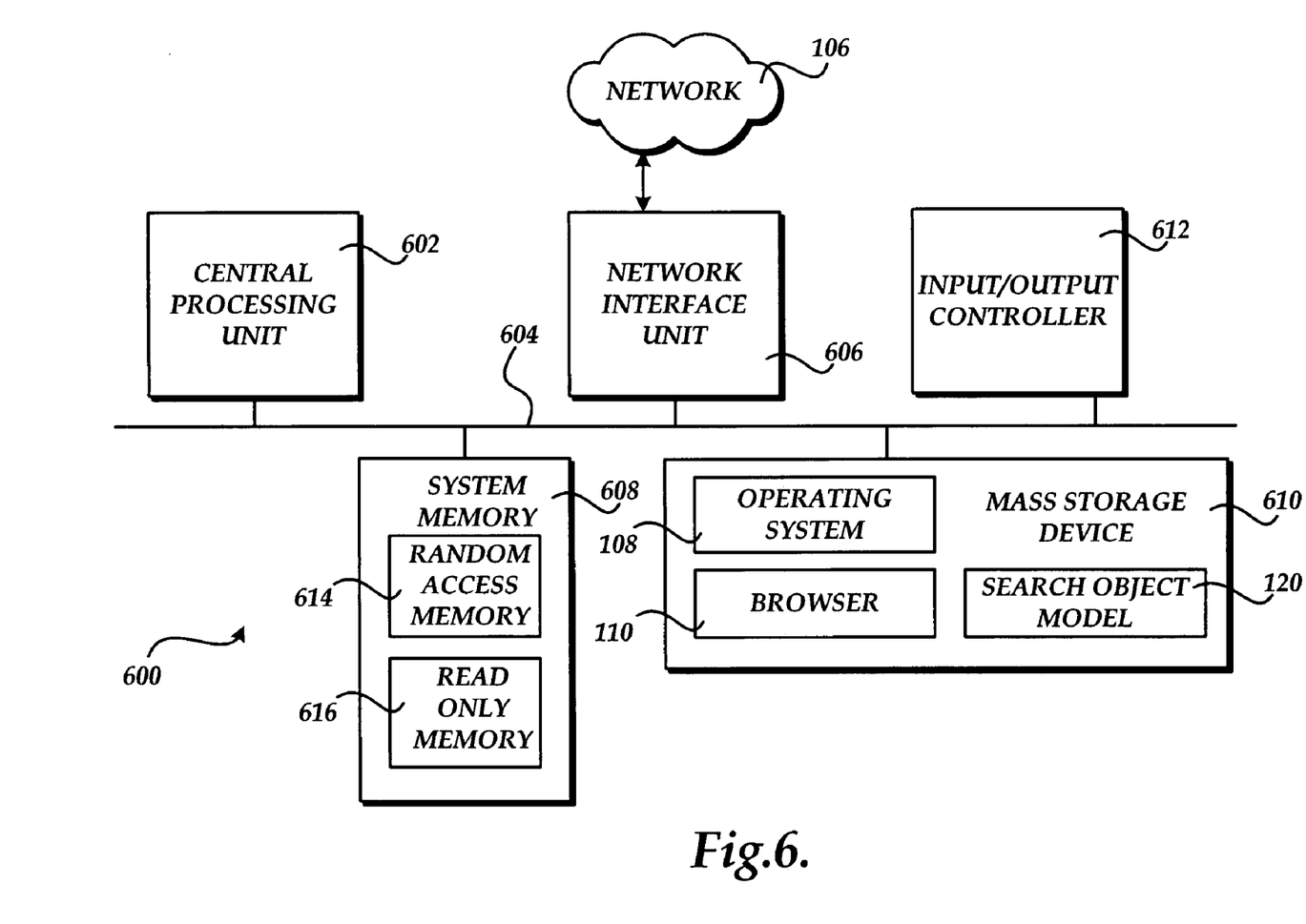
FIG. 6 is a computer architecture diagram showing a computer architecture suitable for implementing the various computer systems described herein.

Referring now to FIG. 6, an illustrative computer architecture for a computer 600 utilized in the various embodiments presented herein will be discussed. The computer architecture shown in FIG. 6 illustrates a conventional desktop, laptop computer, or server computer. The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 108, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 106, such as the Internet. The computer 600 may connect to the network 106 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 108 suitable for controlling the operation of a networked desktop or server computer, such as the WINDOWS XP operating system from MICROSOFT CORPORATION of Redmond, Wash., or the WINDOWS VISTA operating system, also from MICROSOFT CORPORATION. The mass storage device 610 and RAM 614 may also store one or more program modules. In particular, the mass storage device 610 and the RAM 614 may store a Web browser program 110, a search object model 120, and the other program modules shown in FIG. 1 and described above. Other program modules may also be stored in the mass storage device 610 and utilized by the computer 600.

Based on the foregoing, it should be appreciated that systems, methods, and computer-readable media for exposing a simplified search API for performing a search on a relational database are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for searching a relational database, the method comprising:
   providing a search object model on a computer to perform keyword-based and structured query language (SQL)-based searches of the relational database;
   providing an abstract query class of the search object model defining an execute method for causing a query to be performed on the relational database and one or more query properties that specify a query string and the manner in which the query is performed;
   providing a keyword query class derived from the abstract query class, the keyword query class defining a query request using keyword syntax and comprising an execute method which when called causes a keyword query to be performed on the relational database and one or more keyword query properties that specify how the keyword query is to be performed and how results from the keyword query are to be returned; and
   setting the query string to specify one or more keywords to pass directly to a search service for performing a keyword-based search of the relational database.

2. The method of claim 1, further comprising providing a full text structured query language (SQL) query class derived from the query class, the full text SQL query class comprising an execute method which when called causes an SQL query to be performed on the relational database.

3. The method of claim 1, wherein one or more of the query properties correspond to a portion of an SQL statement.

4. The method of claim 3, wherein the query properties comprise a query text property for specifying the query string.

5. The method of claim 4, wherein the query properties further comprise a result types property for specifying one or more search result types to be returned from a query.

6. The method of claim 5, wherein the keyword query properties comprise a select properties property for specifying the properties to be returned from the query.

7. The method of claim 6, wherein the keyword query properties further comprise a sort list property for specifying how one or more search results returned in response to the query are sorted.

8. The method of claim 7, wherein the query properties further comprise a trim duplicates property for specifying that duplicate entries should be removed from the search results.

9. The method of claim 8, wherein the query properties further comprise an ignore noise property for specifying whether noise words should be ignored when performing the query.

10. The method of claim 9, wherein the query properties further comprise a start row property for specifying the first result of one or more search results to be returned in response to the query.

11. The method of claim 10, wherein the query properties further comprise a timeout property for specifying an elapsed time value after which the query should timeout.

12. A method for searching a relational database, the method comprising:

providing a search object model on a computer to perform keyword-based and structured query language (SOL)-based searches of the relational database;

providing an abstract query class of the search object model defining an execute method for causing a query to be performed on the relational database and one or more query properties that specify the manner in which the query is performed;

providing a keyword query class derived from the abstract query class, the keyword query class defining a query request using keyword syntax and comprising an execute method which when called causes a keyword query to be performed on the relational database and one or more keyword query properties that specify how the keyword query is to be performed and how results from the keyword query are to be returned; and exposing functionality provided by the keyword query class through a remote function call operative to receive a request packet as input, the request packet comprising query text specifying one or more keywords to pass directly to a search service for performing a keyword-based search of the relational database and one or more data elements corresponding to the properties of the keyword query class.

13. The method of claim 12, wherein the request packet comprises a query text element for specifying a query string for the keyword query.

14. The method of claim 13, wherein the request packet further comprises a properties element for specifying the properties to be returned from a query.

15. The method of claim 14, wherein the request packet further comprises a sort by element for specifying how the search results returned from the query are sorted.

16. The method of claim 15, wherein the request packet further comprises an enable stemming element for specifying whether a stemmer should be utilized when performing the query.

17. The method of claim 16, wherein the request packet further comprises an ignore noise element for specifying whether noise words should be ignored when performing the query.

18. The method of claim 17, wherein the request packet further comprises a trim duplicates element for specifying that duplicate entries should be removed from search results returned in response to the query.

19. The method of claim 18, wherein the request packet further comprises one or more result types elements for specifying one or more search result types to be returned from the query.

20. A computer-readable storage medium having computer-executable instructions stored thereon which, when executed by a computer, cause the computer to:

create an instance of a keyword query class, the keyword query class defining a query request using keyword syntax and comprising an execute method which when called causes a keyword query to be performed on a relational database and one or more keyword query properties that specify how the keyword query is to be performed and how results from the keyword query are to be returned;

set a property on the instance for specifying query text comprising one or more keywords to be used in the keyword query; and call the execute method on the instance to perform the keyword query on the relational database.

* * * * *